US011692240B2

(12) United States Patent
Chehab

(10) Patent No.: US 11,692,240 B2
(45) Date of Patent: *Jul. 4, 2023

(54) PROCESS FOR MANUFACTURING AN ALUMINUM ALLOY PART

(71) Applicant: C-TEC Constellium Technology Center, Voreppe (FR)

(72) Inventor: Bechir Chehab, Voiron (FR)

(73) Assignee: C-TEC Constellium Technology Center, Voreppe (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/282,285

(22) PCT Filed: Oct. 3, 2019

(86) PCT No.: PCT/FR2019/052347
§ 371 (c)(1),
(2) Date: Apr. 1, 2021

(87) PCT Pub. No.: WO2020/070452
PCT Pub. Date: Apr. 9, 2020

(65) Prior Publication Data
US 2021/0331244 A1 Oct. 28, 2021

(30) Foreign Application Priority Data

Oct. 5, 2018 (FR) ...................... 1871133

(51) Int. Cl.
*C22C 1/00* (2023.01)
*B33Y 70/00* (2020.01)
(Continued)

(52) U.S. Cl.
CPC .............. *C22C 1/0416* (2013.01); *B22F 1/00* (2013.01); *B22F 10/22* (2021.01); *B22F 10/25* (2021.01);
(Continued)

(58) Field of Classification Search
CPC ..... C22C 1/0416; C22C 21/00; C22C 21/003; B22F 10/20; B22F 10/28; B22F 10/64;
(Continued)

(56) References Cited

U.S. PATENT DOCUMENTS 11,555,229 B2  1/2023 Adachi et al.
2010/0077825 A1  4/2010 Chipko et al.
(Continued)

FOREIGN PATENT DOCUMENTS

CN  107429332 A  12/2017
CN  108330344 A  7/2018
(Continued)

OTHER PUBLICATIONS

Sun, Shaobo et.al., "Characterization of Al—Fe—V—Si heat-resistant aluminum alloy components fabricated by selective laser melting", Journal of Material Research, May 28, 2015, pp. 1661-1669, vol. 30.
(Continued)

Primary Examiner — Anthony M Liang
Assistant Examiner — Danny N Kang
(74) Attorney, Agent, or Firm — McBee, Moore & Vanik IP, LLC

(57) ABSTRACT

The invention relates to a process for manufacturing a part comprising a formation of successive solid metal layers (201 ... 20n) that are stacked on top of one another, each layer describing a pattern defined using a numerical model (M), each layer being formed by the deposition of a metal (25), referred to as solder, the solder being subjected to an input of energy so as to start to melt and to constitute, by solidifying, said layer, wherein the solder takes the form of a powder (25), the exposure of which to an energy beam (32) results in melting followed by solidification so as to form a solid layer (201 ... 20n). The process is characterized in that
(Continued)

the solder (25) is an aluminum alloy comprising at least the following alloy elements: —Fe, in a weight fraction of from 1 to 3.7%, preferably from 1 to 3.6%; —Zr and/or Hf and/or Er and/or Sc and/or Ti, in a weight fraction of from 0.5 to 4%, preferably from 1 to 4%, more preferably from 1.5 to 3.5%, even more preferably from 1.5 to 2% each, and in a weight fraction of less than or equal to 4%, preferably less than or equal to 3%, more preferably less than or equal to 2% in total; —Si, in a weight fraction of from 0 to 4%, preferably from 0.5 to 3%; —V, in a weight fraction of from 0 to 4%, preferably from 0.5 to 3%. The invention also relates to a part obtained by this process. The alloy used in the additive manufacturing process according to the invention makes it possible to obtain parts having remarkable features.

28 Claims, 2 Drawing Sheets

(51) Int. Cl.
```
B22F 10/00      (2021.01)
C22C 1/04       (2023.01)
B33Y 40/20      (2020.01)
C22C 21/00      (2006.01)
B22F 10/64      (2021.01)
B22F 12/41      (2021.01)
B22F 10/28      (2021.01)
C21D 1/18       (2006.01)
C22F 1/04       (2006.01)
B22F 10/22      (2021.01)
B22F 10/25      (2021.01)
B22F 1/00       (2022.01)
B22F 3/24       (2006.01)
B33Y 10/00      (2015.01)
```
(52) U.S. Cl.
CPC .............. *B22F 10/28* (2021.01); *B22F 10/64* (2021.01); *B22F 12/41* (2021.01); *B33Y 40/20* (2020.01); *B33Y 70/00* (2014.12); *C21D 1/18* (2013.01); *C22C 21/00* (2013.01); *C22C 21/003* (2013.01); *C22F 1/04* (2013.01); *B22F 2003/248* (2013.01); *B22F 2301/052* (2013.01); *B22F 2301/205* (2013.01); *B22F 2301/35* (2013.01); *B22F 2998/10* (2013.01); *B33Y 10/00* (2014.12)

(58) Field of Classification Search
CPC ................ B22F 12/41; B22F 2003/248; B22F 2301/052; B22F 2301/205; B22F 2301/35; B22F 2998/10; B22F 10/22; B22F 10/25; B22F 3/15; B22F 1/0003; B22F 3/24; B33Y 40/20; B33Y 70/00; B33Y 10/00; B33Y 40/00; C21D 1/18; B23K 2103/10; B23K 9/04; B23K 9/173; B23K 9/23; B23K 26/0006; B23K 26/342; Y02P 10/25
See application file for complete search history.

(56) References Cited

U.S. PATENT DOCUMENTS

2017/0211168 A1    7/2017    Liu et al.
2017/0314109 A1    11/2017   McCloskey

FOREIGN PATENT DOCUMENTS

| | | |
|---|---|---|
| DE | 102007018123 A1 | 10/2008 |
| EP | 2796229 A1 | 10/2014 |
| EP | 3026135 A1 | 6/2016 |
| JP | 6393008 B1 | 9/2018 |
| WO | 2015006447 A1 | 1/2015 |
| WO | 2016/081348 A1 | 5/2016 |
| WO | 2016209652 A1 | 12/2016 |
| WO | 2018000935 A1 | 1/2018 |

OTHER PUBLICATIONS

Sun, Shaobo et.al., "Microstructure and mechanical properties of Al—Fe—V—Si aluminum alloy produced by electron beam melting", Materials Science&Engineering, 2016, pp. 207-214, A659.
International Search Report of International Patent Application No. PCT/FR2019/052347 dated Dec. 12, 2019.
English translation of Office Action issued in related Chinese Patent Application No. 201980065522.0 (dated Mar. 31, 2023).

[Fig. 1]
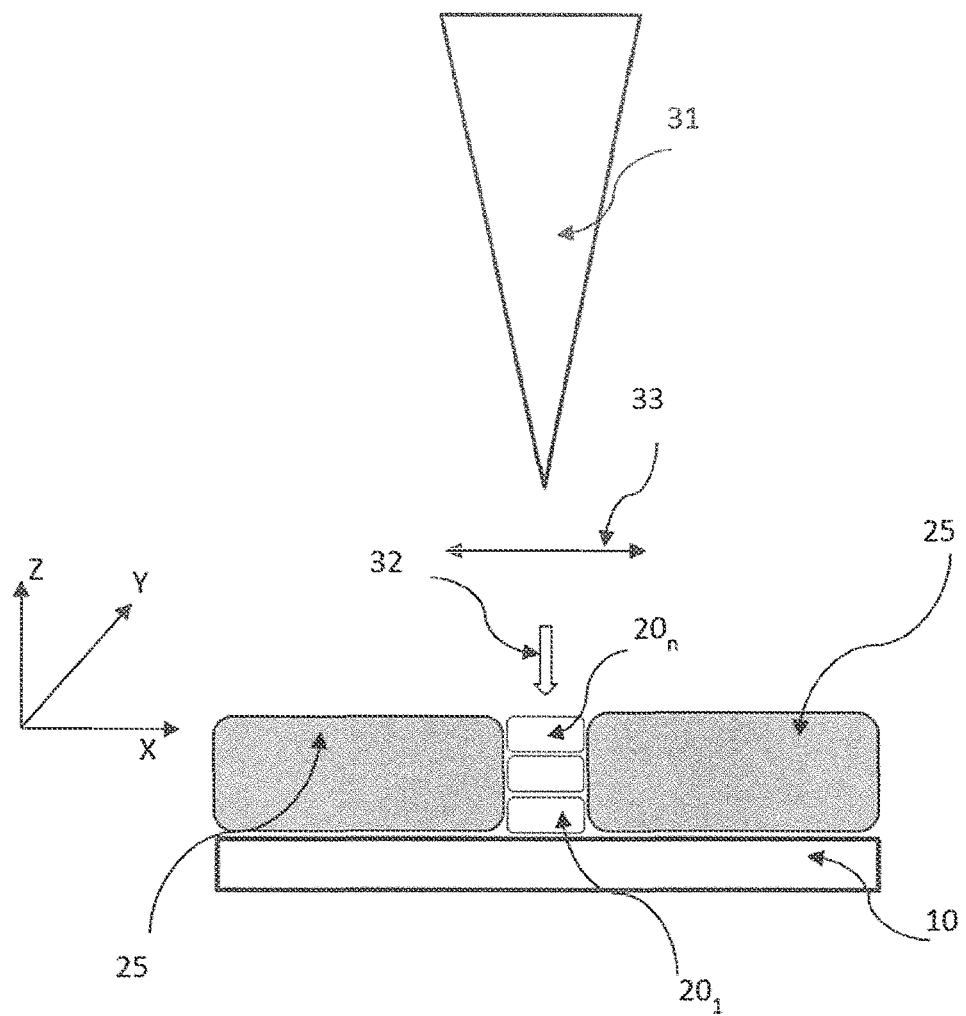

[Fig. 2]
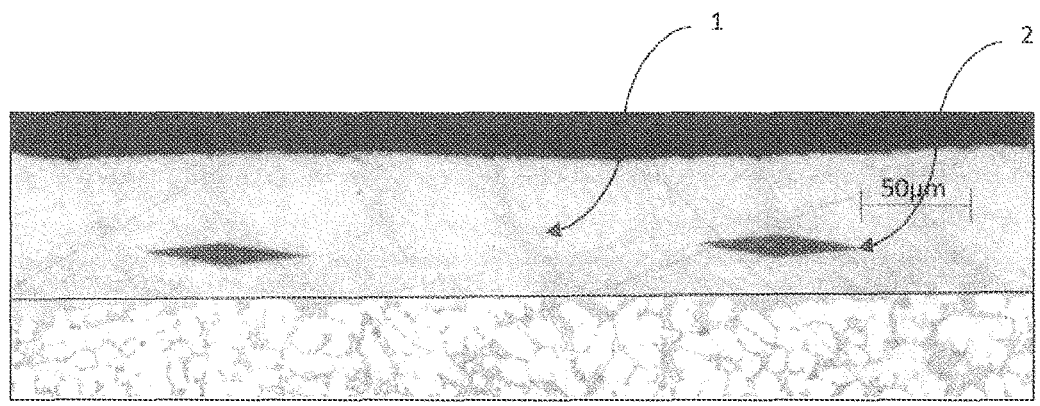
[Fig. 3]
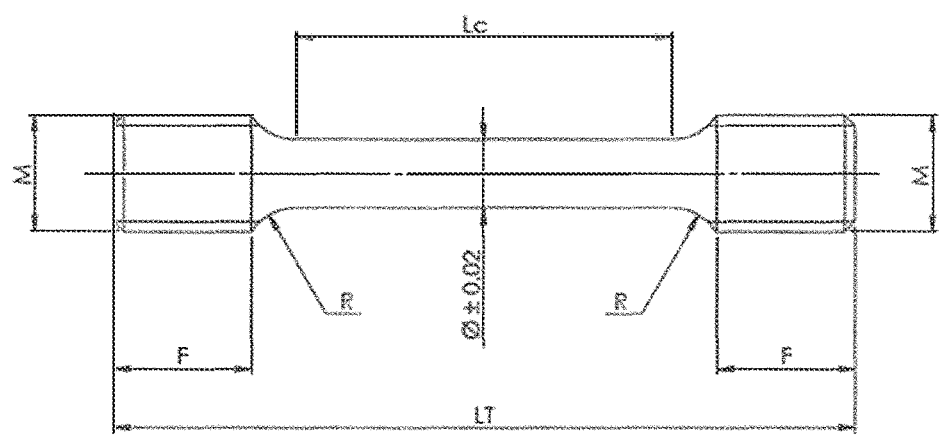

PROCESS FOR MANUFACTURING AN ALUMINUM ALLOY PART

CROSS-REFERENCE TO RELATED APPLICATIONS

This application is the National Stage entry of International Application No. PCT/FR2019/052347, filed 3 Oct. 2019, which claims priority to French Patent Application No. 1871133, filed 5 Oct. 2018.

BACKGROUND

Field

TECHNICAL FIELD

The technical field of the invention is a process for manufacturing an aluminum alloy part, using an additive manufacturing technique.

Description of Related Art

Since the 1980s, additive manufacturing techniques have been developed. They consist of forming a part by adding material, which is the opposite of machining techniques, which are aimed at removing material. Previously confined to prototyping, additive manufacturing is now operational for manufacturing mass-produced industrial products, including metallic parts.

The term "additive manufacturing" is defined, as per the French standard XP E67-001, as a set of processes for manufacturing, layer upon layer, by adding material, a physical object from a digital object. The standard ASTM F2792 (January 2012) also defines additive manufacturing. Various additive manufacturing methods are also defined in the standard ISO/ASTM 17296-1. The use of additive manufacturing to produce an aluminum part, with a low porosity, was described in the document WO2015/006447. The application of successive layers is generally carried out by applying a so-called filler material, then melting or sintering the filler material using an energy source such as a laser beam, electron beam, plasma torch or electric arc. Regardless of the additive manufacturing method applied, the thickness of each layer added is of the order of some tens or hundreds of microns.

A means of additive manufacturing is melting or sintering a filler material taking the form of a powder. This may consist of laser melting or sintering using an energy beam.

Selective laser sintering techniques are known (selective laser sintering, SLS or direct metal laser sintering, DMLS), wherein a layer of metal powder or metal alloy is applied on the part to be manufactured and is sintered selectively according to the digital model with thermal energy from a laser beam. A further type of metal formation process comprises selective laser melting (SLM) or electron beam melting (EBM), wherein the thermal energy supplied by a laser or a targeted electron beam is used to selectively melt (instead of sinter) the metallic powder so that it melts as it cools and solidifies.

Laser melting deposition (LMD) is also known, wherein the powder is sprayed and melted by a laser beam simultaneously.

Patent application WO2016/209652 describes a process for manufacturing a high mechanical strength aluminum comprising: preparing an atomized aluminum powder having one or more desired approximate powder sizes and an approximate morphology; sintering the powder to form a product by additive manufacturing; solution heat treatment; quenching; and aging of the aluminum manufactured with an additive process.

Patent application EP2796229 discloses a process for forming a dispersion-strengthened metal aluminum alloy comprising the steps of: obtaining, in a powder form, an aluminum alloy composition which is capable of acquiring a reinforced microstructure by dispersion; targeting a low energy density laser beam on a portion of the powder having the composition of the alloy; removing the laser beam from the portion of the alloy composition in powder form; and cooling the portion of the alloy composition in powder form at a rate greater than or equal to about $10^{6°}$ C. per second, to thus form the dispersion-strengthened metal aluminum alloy. The method is particularly adapted for an alloy having a composition according to the following formula: $Al_{com-p}Fe_aSi_bX_c$, wherein X represents at least one element selected in the group consisting of Mn, V, Cr, Mo, W, Nb and Ta; "a" ranges from 2.0 to 7.5% in atoms; "b" ranges from 0.5 to 3.0% in atoms; "c" ranges from 0.05 to 3.5% in atoms; and the remainder is aluminum and accidental impurities, on condition that the ratio [Fe+Si]/Si is situated within the range of about 2.0:1 to 5.0:1.

Patent application US2017/0211168 discloses a process for manufacturing a lightweight and strong alloy, with high performances at high temperatures, comprising aluminum, silicon, iron and/or nickel.

Patent application EP3026135 describes a casting alloy comprising 87 to 99 parts by weight of aluminum and silicon, 0.25 to 0.4 parts by weight of copper and 0.15 to 0.35 parts by weight of a combination of at least two elements from Mg, Ni and Ti. This casting alloy is adapted to be prilled by an inert gas to form a powder, the powder being used to form an object by additive laser manufacturing, the object subsequently undergoing an aging treatment.

The publication "Characterization of Al—Fe—V—Si heat-resistant aluminum alloy components fabricated by selective laser melting", Journal of Material Research, Vol. 30, No. 10, May 28, 2015, describes the SLM manufacture of heat-resistant components of composition, as a % by weight, Al-8.5Fe-1.3V-1.7Si.

The publication "Microstructure and mechanical properties of Al—Fe—V—Si aluminum alloy produced by electron beam melting", Materials Science&Engineering A659 (2016)207-214, describes parts of the same alloy as in the previous article obtained by EBM.

There is a growing demand for high-strength aluminum alloys for the SLM application. The 4xxx alloys (essentially Al10SiMg, Al7SiMg and Al12Si) are the most mature aluminum alloys for the SLM application. These alloys offer a very good suitability for the SLM process but suffer from limited mechanical properties.

Scalmalloy® (DE102007018123A1) developed by APWorks offers (with a post-manufacturing thermal treatment of 4 h at 325° C.) good mechanical properties at ambient temperature. However, this solution suffers from a high cost in powder form linked with the high scandium content (~0.7% Sc) thereof and the need for a specific atomization process. This solution also suffers from poor mechanical properties at high temperatures, for example greater than 150° C.

Addalloy™ developed by NanoAl (WO201800935A1) is an Al Mg Zr alloy. This alloy suffers from limited mechanical properties with a hardness peak of about 130 HV.

The mechanical properties of aluminum parts obtained by additive manufacturing are dependent on the alloy forming the filler metal, and more specifically on the composition thereof, the parameters of the additive manufacturing process as well as the thermal treatments applied. The inventors determined an alloy composition which, used in an additive manufacturing process, makes it possible to obtain parts having remarkable characteristics. In particular, the parts obtained according to the present invention have enhanced characteristics with respect to the prior art (particularly an 8009 alloy), in particular in terms of hot hardness (for example after 1 h at 400° C.).

SUMMARY

The invention firstly relates to a process for manufacturing a part including a formation of successive solid metal layers, which are superimposed on each other, each layer describing a pattern defined using a digital model, each layer being formed by depositing a metal, referred to as filler metal, the filler metal being subjected to a supply of energy so as to become molten and to constitute, upon solidifying, said layer, wherein the filler metal takes the form of a powder, the exposure of which to an energy beam results in a melting followed by a solidification, so as to form a solid layer, the process being characterized in that the filler metal is an aluminum alloy comprising at least the following alloy elements:

Fe, according to a mass fraction from 1 to 3.7%, preferably from 1 to 3.6%;

Zr and/or Hf and/or Er and/or Sc and/or Ti, preferably Zr, according to a mass fraction from 0.5 to 4%, preferably from 1 to 4%, more preferably from 1.5 to 3.5%, even more preferably from 1.5 to 2% each, and according to a mass fraction less than or equal to 4%, preferably less than or equal to 3%, more preferably less than or equal to 2% in total;

Si, according to a mass fraction from 0 to 4%, preferably from 0.5 to 3%;

V, according to a mass fraction from 0 to 4%, preferably from 0.5 to 3%.

It should be noted that the alloy according to the present invention can also comprise:

impurities according to a mass fraction less than 0.05% each (i.e. 500 ppm) and less than 0.15% in total;

the remainder being aluminum.

BRIEF DESCRIPTION OF THE DRAWINGS

FIGS. 1-3 depict embodiments as described herein.

DETAILED DESCRIPTION OF A PREFERRED EMBODIMENT

Preferably, the alloy according to the present invention comprises a mass fraction of at least 85%, more preferably of at least 90% of aluminum.

The melting of the powder can be partial or complete. Preferably, from 50 to 100% of the exposed powder becomes molten, more preferably from 80 to 100%.

Optionally, the alloy can also comprise at least one element selected from: W, Nb, Ta, Y, Yb, Nd, Mn, Ce, Co, La, Cu, Ni, Mo and/or mischmetal, according to a mass fraction less than or equal to 5%, preferably less than or equal to 3% each, and less than or equal to 15%, preferably less than or equal to 12%, even more preferably less than or equal to 5% in total. However, in an embodiment, the addition of Sc is avoided, the preferred mass fraction of Sc then being less than 0.05%, and preferably less than 0.01%.

These elements can cause the formation of dispersoids or fine intermetallic phases, making it possible to increase the hardness of the material obtained.

In a manner known to a person skilled in the art, the composition of the mischmetal is generally from about 45 to 50% cerium, 25% lanthanum, 15 to 20% neodymium and 5% praseodymium. Preferably, the aluminum alloy does not comprise Cu and/or Ce and/or mischmetal and/or Co and/or La and/or Mn and/or Cr.

Optionally, the alloy can also comprise at least one element selected from: Sr, Ba, Sb, Bi, Ca, P, B, In and/or Sn, according to a mass fraction less than or equal to 1%, preferably less than or equal to 0.1%, even more preferably less than or equal to 700 ppm each, and less than or equal to 2%, preferably less than or equal to 1% in total. However, in an embodiment, the addition of Bi is avoided, the preferred mass fraction of Bi then being less than 0.05%, and preferably less than 0.01%.

Optionally, the alloy can also comprise at least one element selected from: Ag according to a mass fraction from 0.06 to 1%, Li according to a mass fraction from 0.06 to 1%, and/or Zn according to a mass fraction from 0.06 to 6%, preferably from 0.06 to 0.5%. These elements can act upon the resistance of the material by hardening precipitation or by the effect thereof on the properties of the solid solution. According to an alternative embodiment of the present invention, there is no voluntary addition of Zn, particularly due to the fact that it evaporates during the SLM process.

According to an alternative embodiment of the present invention, the alloy is not an AA7xxx type alloy.

Optionally, the alloy can also comprise Mg according to a mass fraction of at least 0.06% and at most 0.5%. However, the addition of Mg is not recommended, and the Mg content is preferably kept less than an impurity value of 0.05% by mass.

Optionally, the alloy can also comprise at least one element to refine the grains and prevent a coarse columnar microstructure, for example AlTiC or AlTiB2 (for example in AT5B or AT3B form), according to a quantity less than or equal to 50 kg/ton, preferably less than or equal to 20 kg/ton, even more preferably equal to 12 kg/ton each, and less than or equal to 50 kg/ton, preferably less than or equal to 20 kg/ton in total.

According to an embodiment, the process can include, following the formation of the layers:

a solution heat treatment followed by a quenching and an aging, or a thermal treatment typically at a temperature of at least 100° C. and at most 400° C.

and/or a hot isostatic compression (HIC).

The thermal treatment can particularly enable stress relieving of the residual stress and/or an additional precipitation of hardening phases.

The HIC treatment can particularly make it possible to enhance the elongation properties and the fatigue properties. The hot isostatic compression can be carried out before, after or instead of the thermal treatment.

Advantageously, the hot isostatic compression is carried out at a temperature of 250° C. to 550° C. and preferably of 300° C. to 450° C., at a pressure of 500 to 3000 bar and for a duration of 0.5 to 10 hours.

According to a further embodiment, adapted to structural hardening alloys, a solution heat treatment followed by a quenching and an aging of the part formed and/or a hot isostatic compression can be carried out. The hot isostatic compression can in this case advantageously replace the solution heat treatment. However, the process according to the invention is advantageous as it needs preferably no solution heat treatment followed by quenching. The solution heat treatment can have a harmful effect on the mechanical strength in certain cases by contributing to growth of dispersoids or fine intermetallic phases.

According to an embodiment, the method according to the present invention further optionally includes a machining treatment, and/or a chemical, electrochemical or mechanical surface treatment, and/or a tribofinishing. These treatments can be carried out particularly to reduce the roughness and/or enhance the corrosion resistance and/or enhance the resistance to fatigue crack initiation.

Optionally, it is possible to carry out a mechanical deformation of the part, for example after additive manufacturing and/or before the thermal treatment.

The invention secondly relates to a metal part, obtained with a process according to the first subject matter of the invention.

The invention thirdly relates to powder comprising, preferably consisting of, an aluminum alloy comprising at least the following alloy elements:

Fe, according to a mass fraction from 1 to 3.7%, preferably from 1 to 3.6%;

Zr and/or Hf and/or Er and/or Sc and/or Ti, preferably Zr, according to a mass fraction from 0.5 to 4%, preferably from 1 to 4%, more preferably from 1.5 to 3.5%, even more preferably from 1.5 to 2% each, and according to a mass fraction less than or equal to 4%, preferably less than or equal to 3%, more preferably less than or equal to 2% in total;

Si, according to a mass fraction from 0 to 4%, preferably from 0.5 to 3%;

V, according to a mass fraction from 0 to 4%, preferably from 0.5 to 3%.

It should be noted that the aluminum alloy of the powder according to the present invention can also comprise:

impurities according to a mass fraction less than 0.05% each (i.e. 500 ppm) and less than 0.15% in total;

the remainder being aluminum.

Preferably, the alloy of the powder according to the present invention comprises a mass fraction of at least 85%, more preferably of at least 90% of aluminum.

The aluminum alloy of the powder according to the present invention can also comprise:

optionally at least one element selected from: W, Nb, Ta, Y, Yb, Nd, Mn, Ce, Co, La, Cu, Ni, Mo and/or mischmetal, according to a mass fraction less than or equal to 5%, preferably less than or equal to 3% each, and less than or equal to 15%, preferably less than or equal to 12%, even more preferably less than or equal to 5% in total. However, in an embodiment, the addition of Sc is avoided, the preferred mass fraction of Sc then being less than 0.05%, and preferably less than 0.01%; and/or optionally at least one element selected from: Sr, Ba, Sb, Bi, Ca, P, B, In and/or Sn, according to a mass fraction less than or equal to 1%, preferably less than or equal to 0.1%, even more preferably less than or equal to 700 ppm each, and less than or equal to 2%, preferably less than or equal to 1% in total. However, in an embodiment, the addition of Bi is avoided, the preferred mass fraction of Bi then being less than 0.05%, and preferably less than 0.01%; and/or optionally at least one element selected from: Ag according to a mass fraction from 0.06 to 1%, Li according to a mass fraction from 0.06 to 1%, and/or Zn according to a mass fraction from 0.06 to 6%, preferably from 0.06 to 0.5%. According to an alternative embodiment of the present invention, there is no voluntary addition of Zn, particularly due to the fact that it evaporates during the SLM process. According to an alternative embodiment of the present invention, the alloy is not an AA7xxx type alloy; and/or Optionally, Mg according to a mass fraction of at least 0.06% and at most 0.5%. However, the addition of Mg is not recommended, and the Mg content is preferably kept less than an impurity value of 0.05% by mass; and/or optionally at least one element to refine the grains and prevent a coarse columnar microstructure, for example AlTiC or AlTiB2 (for example in AT5B or AT3B form), according to a quantity less than or equal to 50 kg/ton, preferably less than or equal to 20 kg/ton, even more preferably equal to 12 kg/ton each, and less than or equal to 50 kg/ton, preferably less than or equal to 20 kg/ton in total.

Preferably, the aluminum alloy of the powder according to the present invention comprises no Cu and/or Ce and/or mischmetal and/or Co and/or La and/or Mn and/or Cr.

Further advantages and features will emerge more clearly from the following description and from the non-limiting examples, represented in the figures listed below.

FIGURES

FIG. 1 is a diagram illustrating an SLM or EBM type additive manufacturing process.

FIG. 2 shows a micrograph of a cross-section of an Al10Si0.3Mg sample after surface scanning with a laser, cut and polished with two Knoop hardness impressions in the remelted layer.

FIG. 3 is a diagram of the cylindrical TOR4 type test specimen used according to the examples.

In the description, unless specified otherwise:
aluminum alloys are designated according to the nomenclature established by the Aluminum Association;
the chemical element contents are designated as a % and represent mass fractions. Impurity denotes chemical elements unintentionally present in the alloy.

FIG. 1 generally describes an embodiment, wherein the additive manufacturing process according to the invention is used. According to this process, the filler material 25 is presented in the form of an alloy powder according to the invention. An energy source, for example a laser source or an electron source 31, emits an energy beam for example a laser beam or an electron beam 32. The energy source is coupled with the filler material by an optical or electromagnetic lens system 33, the movement of the beam thus being capable of being determined according to a digital model M. The energy beam 32 follows a movement along the longitudinal plane XY, describing a pattern dependent on the digital model M. The powder 25 is deposited on a support 10. The interaction of the energy beam 32 with the powder 25 induces selective melting thereof, followed by a solidification, resulting in the formation of a layer $20_1 \ldots 20_n$. When a layer has been formed, it is coated with filler metal powder 25 and a further layer is formed, superimposed on the layer previously produced. The thickness of the powder forming a layer can for example be from 10 to 100 μm. This additive manufacturing mode is typically known as selective laser melting (SLM) when the energy beam is a laser beam, the process being in this case advantageously executed at atmospheric pressure, and as electron beam melting (EBM) when the energy beam is an electron beam, the process being in this case advantageously executed at reduced pressure, typically less than 0.01 bar and preferably less than 0.1 mbar.

In a further embodiment, the layer is obtained by selective laser sintering (SLS) or direct metal laser sintering (DMLS), the layer of alloy powder according to the invention being selectively sintered according to the digital model selected with thermal energy supplied by a laser beam. In a further embodiment not described by FIG. 1, the powder is sprayed and melted simultaneously by a generally laser beam. This process is known as laser melting deposition.

Further processes can be used, particularly those known as Direct Energy Deposition (DED), Direct Metal Deposition (DMD), Direct Laser Deposition (DLD), Laser Deposition Technology (LDT), Laser Metal Deposition (LMD), Laser Engineering Net Shaping (LENS), Laser Cladding Technology (LCT), or Laser Freeform Manufacturing Technology (LFMT).

In an embodiment, the process according to the invention is used for producing a hybrid part comprising a portion obtained using conventional rolling and/or extrusion and/or casting and/or forging processes optionally followed by machining and a rigidly connected portion obtained by additive manufacturing. This embodiment can also be suitable for repairing parts obtained using conventional processes.

It is also possible, in an embodiment of the invention, to use the process according to the invention for repairing parts obtained by additive manufacturing.

Following the formation of the successive layers, an unwrought part or part in an as-manufactured condition is obtained.

The metal parts obtained with the process according to the invention are particularly advantageous as they have a hardness in as-manufactured condition less than that of a reference made of 8009, and at the same time after a thermal treatment of the same order of magnitude as or greater than that of a reference made of 8009. The lower hardness in as-manufactured condition according to the present invention with respect to an 8009 alloy is considered to be advantageous for the suitability for the SLM process, by inducing a lower level of residual stress during SLM manufacture and thus a lower hot cracking susceptibility. The higher hardness after a thermal treatment (for example 1h at 400° C.) of the alloys according to the present invention with respect to an 8009 alloy provides superior thermal stability. The thermal treatment of one hour at 400° C. could for example be a post-SLM manufacture hot isostatic compression (HIC) step.

The Knoop HK0.05 hardness (with a 0.5 g load, as per the ASTM E384 standard in June 2017) in as-manufactured condition of the metal parts obtained according to the present invention is preferably from 120 to 260 HK, more preferably from 150 to 250 HK. Preferably, the Knoop HK0.05 hardness of the metal parts obtained according to the present invention, after a thermal treatment of at least 100° C. and at most 550° C. and/or a hot isostatic compression, for example after 1 h at 400° C., is from 100 to 220 HK, more preferably from 110 to 210 HK. The Knoop HK0.05 hardness measurement protocol is described in the examples hereinafter.

The powder according to the present invention can have at least one of the following features:

mean particle size from 5 to 100 μm, preferably from 5 to 25 μm, or from 20 to 60 μm. The values given signify that at least 80% of the particles have a mean size within the specified range;

spherical shape. The sphericity of a powder can for example be determined using a morphogranulometer;

good castability. The castability of a powder can for example be determined as per the standard ASTM B213 or the standard ISO 4490:2018. According to the standard ISO 4490:2018, the flow time is preferably less than 50 s;

low porosity, preferably from 0 to 5%, more preferably from 0 to 2%, even more preferably from 0 to 1% by volume. The porosity can particularly be determined by scanning electron microscopy or by helium pycnometry (see the standard ASTM B923);

absence or small quantity (less than 10%, preferably less than 5% by volume) of small, so-called satellite, particles (1 to 20% of the mean size of the powder), which adhere to the larger particles.

The powder according to the present invention can be obtained with conventional atomization processes using an alloy according to the invention in liquid or solid form or, alternatively, the powder can be obtained by mixing primary powders before the exposure to the energy beam, the different compositions of the primary powders having an average composition corresponding to the composition of the alloy according to the invention.

It is also possible to add infusible, non-soluble particles, for example oxides or $TiB_2$ particles or carbon particles, in the bath before atomizing the powder and/or during the deposition of the powder and/or during the mixing of the primary powders. These particles can serve to refine the microstructure. They can also serve to harden the alloy if they are of nanometric size. These particles can be present according to a volume fraction less than 30%, preferably less than 20%, more preferably less than 10%.

The powder according to the present invention can be obtained for example by gas jet atomization, plasma atomization, water jet atomization, ultrasonic atomization, centrifugal atomization, electrolysis and spheroidization, or grinding and spheroidization.

Preferably, the powder according to the present invention is obtained by gas jet atomization. The gas jet atomization process starts with casting a molten metal through a nozzle. The molten metal is then reached by inert gas jets, such as nitrogen or argon, and atomized into very small droplets which are cooled and solidified by falling inside an atomization tower. The powders are then collected in a can. The gas jet atomization process has the advantage of producing a powder having a spherical shape, unlike water jet atomization which produces a powder having an irregular shape. A further advantage of gas jet atomization is a good powder density, particularly thanks to the spherical shape and the particle size distribution. A further advantage of this process is a good reproducibility of the particle size distribution.

After the manufacture thereof, the powder according to the present invention can be oven-dried, particularly in order to reduce the moisture thereof. The powder can also be packaged and stored between the manufacture and use thereof.

The powder according to the present invention can particularly be used in the following applications:

Selective Laser Sintering or SLS;
Direct Metal Laser Sintering or DMLS;
Selective Heat Sintering or SHS;
Selective Laser Melting or SLM;
Electron Beam Melting or EBM;
Laser Melting Deposition;
Direct Energy Deposition or DED;
Direct Metal Deposition or DMD;

Direct Laser Deposition or DLD;
Laser Deposition Technology or LDT;
Laser Engineering Net Shaping or LENS;
Laser Cladding Technology or LCT;
Laser Freeform Manufacturing Technology or LFMT;
Laser Metal Deposition or LMD;
Cold Spray Consolidation or CSC;
Additive Friction Stir or AFS;
Field Assisted Sintering Technology, FAST or spark plasma sintering); or
Inertia Rotary Friction Welding or IRFW.

The invention will be described in more detail in the example hereinafter.

The invention is not limited to the embodiments described in the description above or in the examples hereinafter, and can vary widely within the scope of the invention as defined by the claims attached to the present description.

EXAMPLES

Example 1

Three alloys according to the present invention, called Innov1, Innov2 and Innov3, and one 8009 alloy according to the prior art were cast in a copper mold using an Induthem VC 650V machine to obtain ingots 130 mm high, 95 mm wide and 5 mm thick. The composition of the alloys is given as a mass fraction percentage in Table 1 below.

TABLE 1

| Alloys | Si | Fe | V | Zr |
|---|---|---|---|---|
| Reference (8009) | 1.8 | 8.65 | 1.3 | — |
| Innov1 | 1.7 | 3.5 | 1.3 | 1 |
| Innov2 | 1.7 | 3.5 | 1.3 | 2 |
| Innov3 | 1.7 | 3.5 | 1.3 | 3 |

Alloys as described in Table 1 above were tested using a rapid prototyping method. Samples were machined by sweeping the surface with a laser, in the form of strips of dimensions 60×22×3 mm, from the ingots obtained above. The strips were placed in an SLM machine and surface sweeps were performed with a laser by following the same sweep strategy and process conditions representative of those used for the SLM process. It was indeed observed that it was possible in this way to evaluate the suitability of alloys for the SLM process and particularly the surface quality, the hot cracking susceptibility, the hardness in the unwrought state and the hardness after thermal treatment.

Under the laser beam, the metal melts in a bath from 10 to 350 μm in thickness. After scanning with a laser, the metal cools rapidly as in the SLM process. After the laser sweep, a thin surface layer from 10 to 350 μm in thickness was melted then solidified. The properties of the metal in this layer are similar to the properties of the metal in the core of a part manufactured by SLM, as the sweep parameters are selected appropriately. The laser surface sweep of the various samples was performed using a ProX300 selective laser melting machine of the 3DSystems brand. The laser source had a power of 250 W, the vector deviation was 60 μm, the sweep rate was 300 mm/s and the beam diameter was 80 μm.

Knoop Hardness Measurement

Hardness is an important property for alloys. Indeed, if the hardness in the layer remelted by sweeping the surface with a laser is high, a part manufactured with the same alloy will potentially have a high maximum stress limit.

To evaluate the hardness of the remelted layer, the strips obtained above were cut in the plane perpendicular to the direction of the laser passes and were then polished. After polishing, hardness measurements were made in the remelted layer. The hardness measurement was made with a Struers Durascan model apparatus. The Knoop HK0.05 hardness method with the main diagonal of the impression placed parallel with the plane of the remelted layer was selected to keep enough distance between the impression and the edge of the sample. 15 impressions were positioned at mid-thickness of the remelted layer. FIG. 2 shows an example of the hardness measurement. Reference 1 corresponds to the remelted layer and reference 2 corresponds to a Knoop hardness impression.

The hardness was measured according to the Knoop scale with a 50 g load (HK0.05) after laser treatment (in the unwrought state) and after an additional thermal treatment at 400° C. for variable durations, making it possible in particular to evaluate the hardenability of the alloy during a thermal treatment and the effect of an optional HIC treatment on the mechanical properties.

The Knoop HK0.05 hardness values in the unwrought state and after various durations at 400° C. are given in Table 2 hereinafter (HK0.05).

TABLE 2

| Alloy | Unwrought state | After 1 h at 400° C. | After 4 h at 400° C. | After 10 h at 400° C. |
|---|---|---|---|---|
| Reference (8009) | 316 | 145 | 159 | 155 |
| Innov1 | 172 | 146 | 153 | 141 |
| Innov2 | 187 | 172 | 171 | 150 |
| Innov3 | 199 | 179 | 188 | 186 |

The alloys according to the present invention (Innov1 to Innov2) showed a Knoop HK0.05 hardness in the unwrought state less than that of the reference 8009 alloy, but, after a thermal treatment at 400° C., of the same order of magnitude as or greater than that of the reference 8009 alloy.

Table 2 above clearly shows the superior thermal stability of the alloys according to the present invention with respect to the reference 8009 alloy. Indeed, the hardness of the 8009 alloy fell significantly from the start of the thermal treatment, then reached a plateau. On the other hand, the hardness of the alloys according to the present invention decreased progressively.

Example 2

An alloy according to the present invention having the composition as presented in Table 3 hereinafter, in mass percentages, was prepared.

TABLE 3

| Alloy | Fe | Si | Zr | V |
|---|---|---|---|---|
| Innov4 | 3.5 | 1.7 | 3 | 1.3 |

5 kg of the alloy powder was successfully atomized using a VIGA (Vacuum Inert Gas Atomization) atomizer. The powder was used successfully in a Form Up 350 model selective laser melting machine for producing tensile test specimen blanks. The tests were carried out with the following parameters: layer thickness: 60 μm, laser power: 370

W, vector deviation: 0.11 to 0.13 mm, laser speed: 1000 to 1400 mm/s. The construction slab was heated to a temperature of 200° C. (without being bound by the theory, it would appear that heating the slab from 50° C. to 300° C. is beneficial for reducing residual stress and cracking of thermal origin on the parts produced).

The blanks were cylindrical with a height of 45 mm and a diameter of 11 mm for the tensile tests in the direction of manufacture (Z direction). The blanks were subjected to a stress relief thermal treatment of 2 h at 300° C. Some blanks were kept in the as-stress relieved condition and other blanks were subjected to an additional treatment of 1 h at 400° C. (hardening annealing). TOR4 type cylindrical test specimens having the characteristics described hereinafter in mm (see Table 4 and FIG. 3) were machined using the blanks described above.

TABLE 4

| Type | Ø | M | LT | R | Lc | F |
|---|---|---|---|---|---|---|
| TOR 4 | 4 | 8 | 45 | 3 | 22 | 8.7 |

In FIG. 3 and Table 4, 0 represents the diameter of the central portion of the test specimen, M the width of the two ends of the test specimen, LT the total length of the test specimen, R the radius of curvature between the central portion and the ends of the test specimen, Lc the length of the central portion of the test specimen and F the length of the two ends of the test specimen.

Tensile tests were carried out at ambient temperature and hot (200° C. and 250° C.) as per the standards NF EN ISO 6892-1 (2009-10) and ASTM E8-E8M-13a (2013). The results obtained are shown in Table 5 hereinafter.

TABLE 5

| Direction | Thermal treatment | Test temperature | Rp0.2 (MPa) | Rm (MPa) | A % |
|---|---|---|---|---|---|
| Z | As-stress relieved condition (2 h at 300° C.) | 25° C. | 372 | 410 | 6.7 |
| Z | Hardening annealing (1 h at 400° C.) | 25° C. | 432 | 467 | 4.8 |
| Z | Hardening annealing (1 h at 400° C.) | 200° C. | 230 | 249 | 4.7 |
| Z | Hardening annealing (1 h at 400° C.) | 250° C. | 203 | 222 | 3.7 |

According to Table 5 above, hardening annealing resulted in a significant increase in the mechanical strength with respect to the unwrought state, associated with a reduction in elongation (if the first two rows of Table 5 are compared). The alloy according to the present invention therefore makes it possible to avoid a conventional solution heat treatment/quenching type thermal treatment. The alloy according to the present invention also has good hot mechanical performances: Rp0.2 of 230 MPa and 203 MPa at 200° C. and 250° C., respectively.

The thermal treatment (hardening annealing) of 1 h at 400° C. carried out before the tensile tests makes it possible to simulate the effect of any HIC treatment at 400° C. or of long-term aging at an operating temperature between 100 and 300° C.

In conclusion, the alloy according to the present invention combines good performances at ambient temperature and at high temperature, as well as a good thermal stability.

The invention claimed is:

1. A process for manufacturing a part comprising a formation of successive solid metal layers, which are superimposed on each other, each layer describing a pattern defined using a digital model (M), each layer being formed by depositing a filler metal, the filler metal being subjected to an energy beam so as to become molten and to constitute, upon solidifying, said solid metal layer, wherein the filler metal takes the form of a powder,
   wherein the filler metal is an aluminum alloy comprising at least the following alloy elements:
   Fe, according to a mass fraction from 1 to 3.7%;
   Zr and/or Hf and/or Er and/or Sc and/or Ti, according to a mass fraction from 0.5 to 4% each if present, and according to a mass fraction less than or equal to 4% in total;
   Si, according to a mass fraction from 0 to 4%; and
   V, according to a mass fraction from 0 to 4%;
   and wherein the aluminum alloy i) comprises no Cu, ii) comprises Mg according to a mass fraction of at most 0.5%, or iii) comprises no Cu and comprises Mg according to a mass fraction of at most 0.5%.

2. The process according to claim 1, wherein the aluminum alloy also comprises at least one element selected from: W, Nb, Ta, Y, Yb, Nd, Mn, Ce, Co, La, Cu, Ni, Mo and/or mischmetal, according to a mass fraction less than or equal to 5% each, if present, and less than or equal to 15%, in total.

3. The process according to claim 1, wherein the aluminum alloy comprises no Cu and/or Ce and/or mischmetal and/or Co and/or La and/or Mn and/or Cr.

4. The process according to claim 1, wherein the aluminum alloy also comprises at least one element selected from: Sr, Ba, Sb, Bi, Ca, P, B, In and/or Sn each, if present, according to a mass fraction less than or equal to 1%, and less than or equal to 2% in total.

5. The process according to claim 1, wherein the aluminum alloy also comprises at least one element selected from: Ag according to a mass fraction from 0.06 to 1%, Li according to a mass fraction from 0.06 to 1%, and/or Zn according to a mass fraction from 0.06 to 6%.

6. The process according to claim 1, wherein the aluminum alloy also comprises at least one element or compound to refine the grains.

7. The process according to claim 1, further comprising following the formation of the layers,
   a solution heat treatment followed by a quenching and an aging, or
   a thermal treatment typically at a temperature of at least 100 cc and at most 400 cc,
   and/or a hot isostatic compression (HIC).

8. A metal part obtained by a process according to claim 1.

9. A powder comprising an aluminum alloy comprising:
   Fe, according to a mass fraction from 1 to 3.7%;
   Zr and/or Hf and/or ER and/or Sc and/or Ti, according to a mass fraction from 0.5 to 3.5% each, if present, and according to a mass fraction less than or equal to 3% in total;
   Si, according to a mass fraction from 0 to 4%; and
   V, according to a mass fraction from 0 to 4%.

10. The process according to claim 1, wherein the filler metal is an aluminum alloy comprising at least the following alloy elements:
   Fe, according to a mass fraction from 1 to 3.6%;

Zr and/or Hf and/or Er and/or Sc and/or Ti, according to a mass fraction from 1.5 to 2% each if present, and according to a mass fraction less than or equal to 2% in total;

Si, according to a mass fraction from 0.5 to 3%; and

V, according to a mass fraction from 0.5 to 3%.

11. The process according to claim 1, wherein the aluminum alloy also comprises at least one element selected from: W, Nb, Ta, Y, Yb, Nd, Mn, Ce, Co, La, Cu, Ni, Mo and/or mischmetal, according to a mass fraction less than or equal to 3% each, and less than or equal to 5% in total.

12. The process according to claim 1, wherein the aluminum alloy also comprises at least one element selected from: Sr, Ba, Sb, Bi, Ca, P, B, In and/or Sn, according to a mass fraction less than or equal to 700 ppm each, if present, and less than or equal to 1% in total.

13. The process according to claim 6, wherein the element or compound to refine the grains comprises AlTiC or AlTiB2, according to a quantity less than or equal to 12 kg/ton each, and less than or equal to 20 kg/ton in total.

14. The process according to claim 1, wherein the aluminum alloy comprises no Cu.

15. The process according to claim 1, wherein the aluminum alloy comprises Mg according to a mass fraction of at most 0.5%.

16. The process according to claim 14, wherein the aluminum alloy comprises Mg according to a mass fraction of at most 0.5%.

17. The powder according to claim 9, wherein the aluminum alloy comprises no Cu.

18. The powder according to claim 9, wherein the aluminum alloy comprises Mg according to a mass fraction of at most 0.5%.

19. The powder according to claim 17, wherein the aluminum alloy comprises Mg according to a mass fraction of at most 0.5%.

20. The process according to claim 6, wherein the element or compound to refine the grains comprises AlTiC or AlTiB2, according to a quantity less than or equal to 50 kg/ton each, and less than or equal to 50 kg/ton in total.

21. The process according to claim 1, wherein the filler metal comprises Fe according to a mass fraction from 1 to 3.6%.

22. The process according to claim 1, wherein the filler metal comprises Zr and/or Hf and/or Er and/or Sc and/or Ti, according to a mass fraction from 1.5 to 2% each, if present, and according to a mass fraction less than or equal to 3% in total.

23. The process according to claim 1, wherein the filler metal comprises Si according to a mass fraction from 0.5 to 3%.

24. The process according to claim 1, wherein the filler metal comprises V according to a mass fraction from 0.5 to 3%.

25. The powder according to claim 9, comprising an aluminum alloy comprising: Fe according to a mass fraction from 1 to 3.6%.

26. The powder according to claim 9, comprising an aluminum alloy comprising: Zr and/or Hf and/or ER and/or Sc and/or Ti, according to a mass fraction from 1.5-2% each, if present, and according to a mass fraction less than or equal to 3% in total.

27. The powder according to claim 9, comprising an aluminum alloy comprising: Si according to a mass fraction from 0.5 to 3%.

28. The powder according to claim 9, comprising an aluminum alloy comprising: V according to a mass fraction from 0.5 to 3%.

* * * * *